Sept. 11, 1962 T. C. GALLAGHER 3,053,372
BALE LOADER

Filed June 17, 1960 3 Sheets-Sheet 1

INVENTOR
THOMAS C. GALLAGHER
ATTORNEYS

Sept. 11, 1962     T. C. GALLAGHER     3,053,372
BALE LOADER

Filed June 17, 1960     3 Sheets-Sheet 2

INVENTOR
THOMAS C. GALLAGHER

BY
ATTORNEYS

Sept. 11, 1962 T. C. GALLAGHER 3,053,372
BALE LOADER
Filed June 17, 1960 3 Sheets-Sheet 3
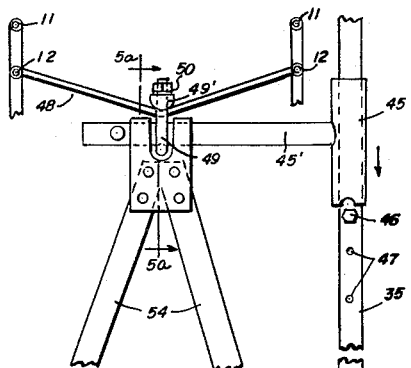
FIG. 5
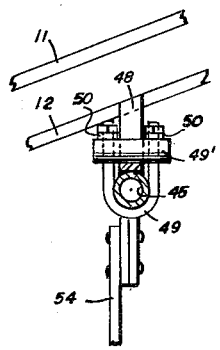
FIG. 5a
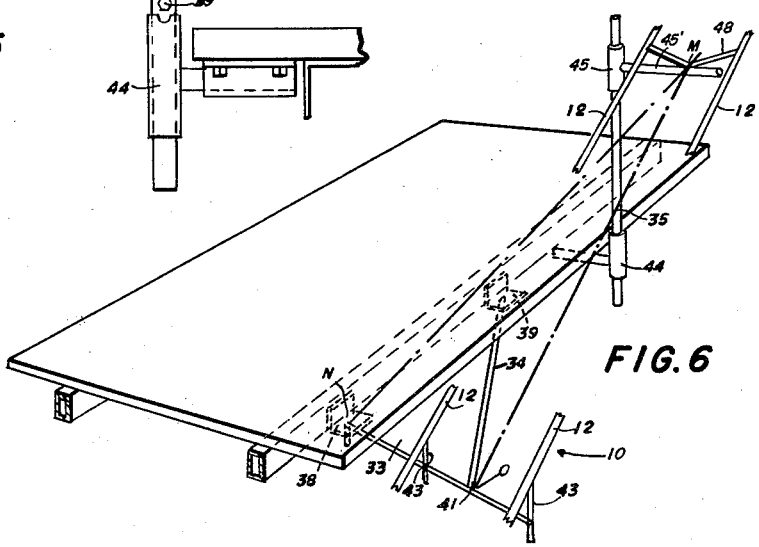
FIG. 6
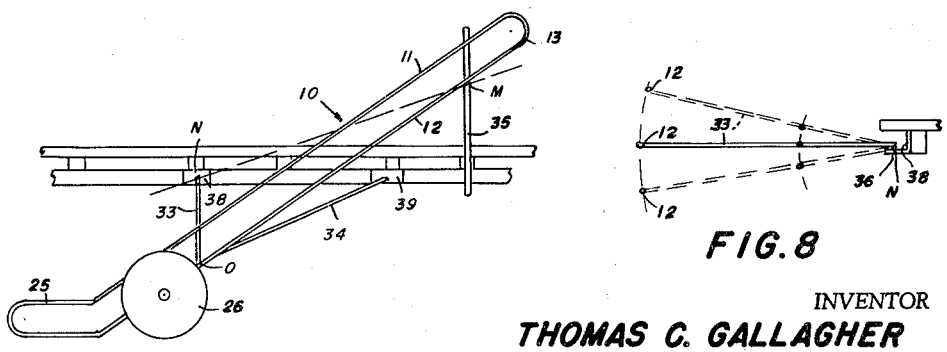
FIG. 7
FIG. 8
INVENTOR
THOMAS C. GALLAGHER
BY
ATTORNEYS United States Patent Office 3,053,372
Patented Sept. 11, 1962

3,053,372
BALE LOADER
Thomas Clifford Gallagher, R.R. 1, Box 703,
Albuquerque, N. Mex.
Filed June 17, 1960, Ser. No. 36,776
10 Claims. (Cl. 198—7)

This invention relates to a portable loading device and more particularly to a machine for loading baled agricultural products onto a vehicle such as a truck or trailer to which the machine is attached.

It is common practice to bale hay and other agricultural products by the use of traveling hay balers which pick up the hay from the field, compress and bind it into bales, and drop the resultant bales roughly into rows on the field. Many farmers remove the heavy bales from the field by manually loading them onto farm trailers or trucks to be transported for storage. To avoid this heavy and undesirable chore various mechanical devices have been developed for loading bales from the ground onto transporting vehicles; however, because of the complexity and resultant high cost of such devices, only those farmers having large amounts of products to harvest have been able to afford them.

It is the principal object of this invention to provide a lightweight, efficient, simply constructed, portable bale loader which is within the means of the average farmer.

An important object of this invention is to provide a portable bale loader for attachment to and movement by a conventional transporting vehicle, thereby eliminating the need for an elaborate carried assembly.

Another object of this invention is to provide a simple means for attaching the loader to the transporting vehicle such that the loader may be readily attached or detached from said vehicle.

Still another object of this invention is to provide reversible means for attaching the loader to the transporting vehicle whereby the loader may easily be attached to either side of the vehicle.

A further object of this invention is to provide a simple means for powering the novel loading machine.

A still further object of this invention consists in the provision of means for attaching the loader to the vehicle whereby it has extreme flexibility to follow in spite of major inequalities in ground levels over which the assembly travels.

The above and other objects of this invention will become apparent from the following disclosure.

The invention is illustrated in the following drawings, in which:

FIGURE 1 is a side elevation of a loading machine embodying the features of this invention attached to the side of a conventional flat-bed truck;

FIGURE 2, shown on a larger scale, includes more details of the novel loading machine of FIGURE 1 but illustrates only a fragment of the truck;

FIGURE 5 is a fragmentary elevation of the rear support standard for the loading machine as viewed from the rear;

FIGURE 5a is a vertical section taken on line 5a—5a of FIGURE 5;

FIGURE 6 is a perspective and schematic view of the truck bed and mounted loader frame illustrating the pivoting axis of the loader relative to the truck;

FIGURE 7 is a schematic side elevation illustrating the pivotal axis as shown in FIGURE 6; and FIGURE 8 illustrates the angular range of flexibility of the front pivoting coupling.

The loading machine of this invention is intended to be attached to the side of a flat-bed truck or trailer by means of a novel coupling arrangement which will later be described in greater detail and lifts bales from the ground to an elevated platform from which they are lifted by a helper onto the truck or trailer bed.

Figure 1:
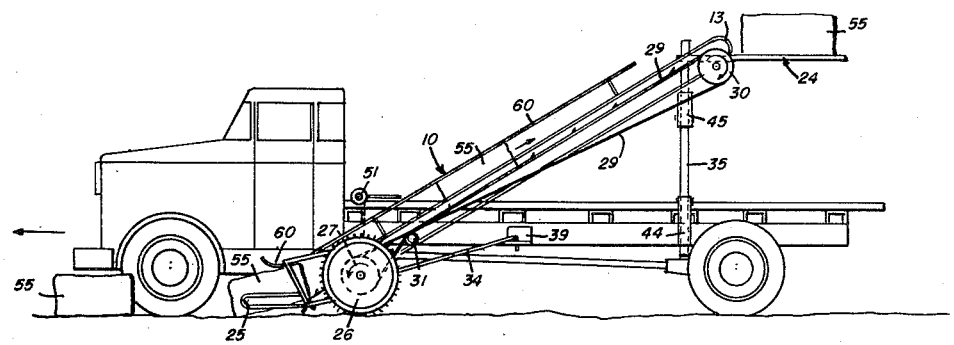

Referring to FIGURE 1, the transporting vehicle is illustrated as a flat-bed truck supporting and powering the apparatus of the present invention through the latter's own traction wheel. The elongated frame of the loader 10 comprises similar, spaced, parallel side members, each composed of an upper bar 11 and lower bar 12 joined in parallel vertically spaced relation at both ends 13, $13^1$. These sides frame members are held in lateral spaced relation by means of a number of transversely extending cross bars 14 located at intervals between the ends of the lower bars 12 of the side members. Parallel, laterally spaced, skid plates 15, FIGURES 3 and 4, are attached to cross bars 14 and extend from the lowermost to the uppermost of these.

Centrally located and parallel to skid plates 15 a U-shaped channel member 16 is attached to the cross bars 14 to provide a guide for the conveyor chain 17. The upper end of chain channel 16 terminates on the uppermost cross bar 14 and the lower end extends a slight amount below the lowest cross bar 14 and is bent downwardly a slight amount to guide the conveyor chain 17 smoothly into the channel. The endless conveyor chain 17 extends between two sprocket wheels, a drive sprocket 18 above the upper end of chain channel 16 and driven sprocket 19 below the lower end of channel 16. The sprocket wheels are each rigidly mounted, respectively, to the centers of shafts 20 and 21 which are journalled to the lower frame members 12 at each end. The journals of the upper shaft 20 are adjustable longitudinally along the frame members 12 to maintain the conveyor chain in alignment and under tension.

Figure 2:
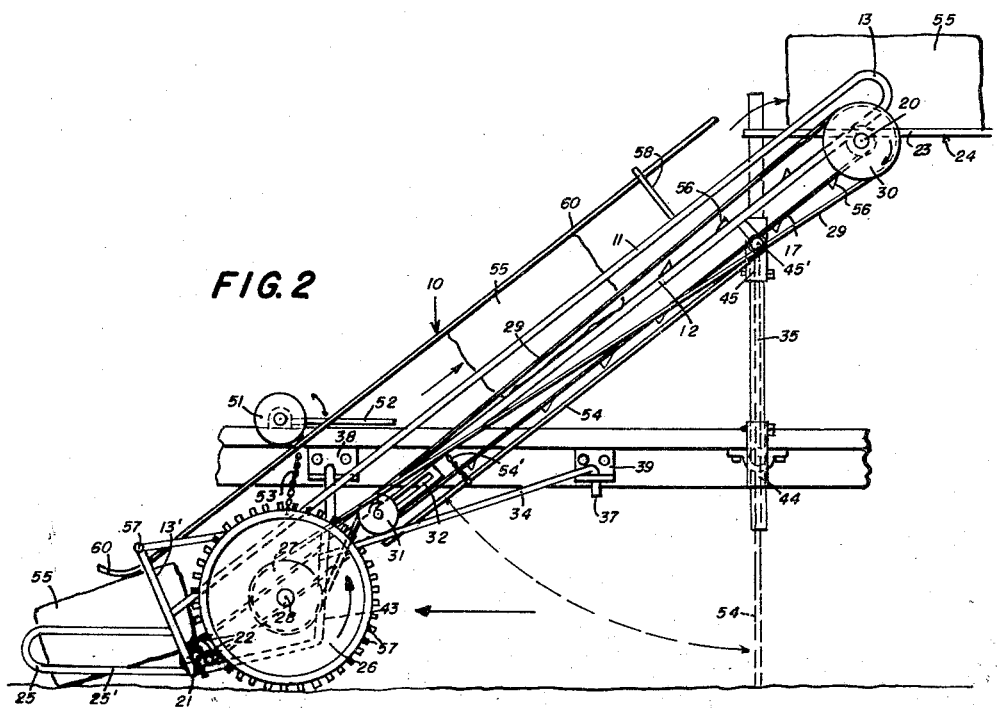
Figure 3:
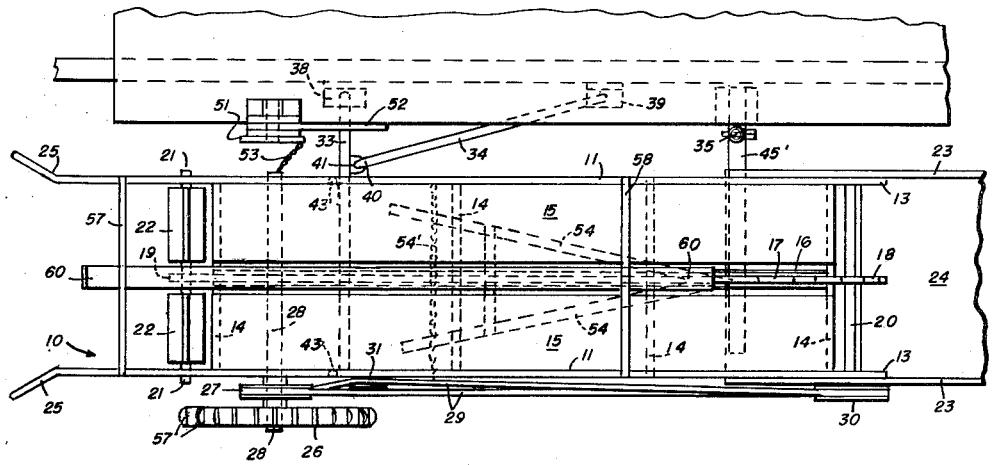
FIGURE 3 is a top plan view of the assembled loading machine and truck.
Figure 4:
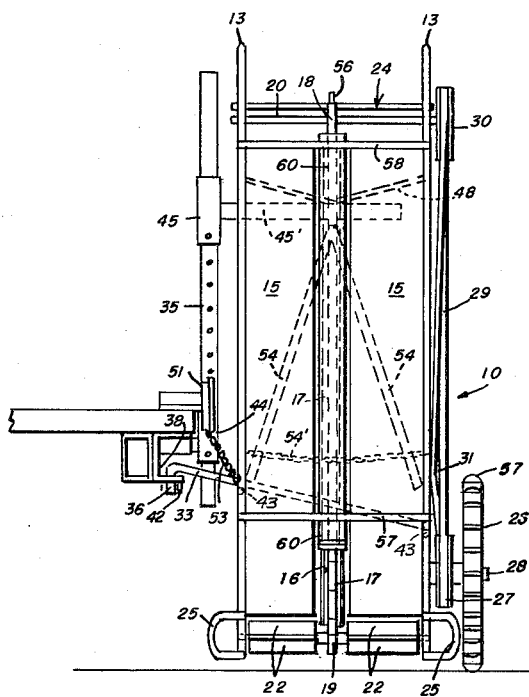
FIGURE 4 is a front view of the loading machine shown mounted on the side of a flat-bed truck.

A set of radial vanes 22 is rigidly mounted on each side of the sprocket on lower shaft 21, which when rotating close to the ground as shown in FIGURES 3 and 4 lift bales onto the conveyor chain 17. Lugs 56, FIGURE 2, are mounted at intervals along the conveyor chain 17 to engage and hold the bales on the inclined surfaces of skid plates 15 as they move upward. Upper side rails 11 prevent the bales from falling from the sides of the skids.

Cantilevered rearwardly from the upper portion of side frame members 11 and 12 are two substantially horizontal members 23 which support a bale receiving platform 24. The upper surface of the platform is substantially at the same level as the top portion of conveyor chain 17 so that bales conveyed upwardly will be delivered on the platform. Attached to the forward portions of frames 11 and 12 are combination skids and guides 25 which serve to both center the bales in front of the loader as the latter moves forwardly and at the same time provide surfaces $25^1$ which guide the front end of the loader over elevated areas of the field without damage to the machine.

To simplify explanation of the operation of the loader, the conveyor chain 17 is shown powered independently of the engine of the towing vehicle by having drive sprocket shaft 20, upon which drive sprocket 18 is mounted, connected to the ground contact wheel 26 by means of the crossed belt 29. This wheel 26 has traction lugs 57 of any design on its peripheral surface to enable it to positively engage the ground and thus drive the conveyor chain 17 as the loader moves forward. Drive pulley 27 is coupled rigidly to the ground contact wheel 26 and both are journalled on a fixed axle 28 which is attached to the lower frame bars 12 of the conveyor. The crossed V-belt 29 transfers power from the rotating drive pulley 27 to pulley 30 which is rigidly mounted on the end of the drive sprocket shaft 20. An idler pulley 31 operates on the slack side of the belt 29 to maintain proper tension on the belt and to maintain it clear of other parts. It is attached to the frame by a bracket 32 which allows adjustment of the pulley longitudinally along the frame to compensate for variations in the length of the belt 29.

The loading machine is flexibly attached to the towing vehicle by means of the following novel couplings; a transverse bar coupling 33, a longitudinal stabilizer and traction coupling 34, and a support standard 35. The longitudinal stabilizer and traction coupling 34 and transverse bar coupling 33 both have terminal hooks 36 and 37, respectively, for pivotal attachment to holes in brackets 38 and 39 which are permanently mounted on the side of the frame of the towing vehicle. The opposite end of the longitudinal stabilizer and traction coupling 34 also has a hook 40 which is inserted in a hole in bracket 41 on the transverse coupling 33 near its inner end. The hooks 36, 37 and 40 all are held against displacement by retaining keys 42. The transverse bar coupling is rigidly attached to two generally vertical bars 43, FIGURES 2 and 3, depending from the frame bars 12 on the outer side, by means of U-bolts. Since the loading machine is intended to be mounted on towing vehicles of varying heights, the U-bolts holding the transverse bar coupling to the conveyor frame vertical members 43 may be adjusted in order that the loading machine will be maintained substantially level.

The rear portion of the loader is held in elevated position by support standard 35 which is adjustably mounted on the side of the towing vehicle by means of a socketed bracket 44 which is permanently mounted on the vehicle with provision for lateral adjustment as shown. The support standard 35 telescopes inside the tubular socket part of the bracket and rests on pin 59 which passes horizontally through the support standard 35 in adjusted positions. A bracket 45 having a horizontal arm 45¹ is adjustably attached to the upper portion of the support standard 35 and may be raised or lowered therealong and held in place by inserting pin 46 through any of the holes 47. A V-shaped, transverse support rod 48, attached to the lower frame members 12 as by welding is flexibly mounted on the horizontal arm 45¹ by means of a U-bolt 49 and spring washers 50, seen in FIGURES 5 and 5a which bear on the U-bolt plate 49¹ of semi-cylindrical configuration such that the conveyor may tilt slightly to compensate for variations in the longitudinal and transverse inclination of the loader relative to the towing vehicle.

The three-point coupling of the loader to the towing vehicle permits a "floating action" as the loader wheel passes over irregularities in the field. Since the transverse bar coupling 33 is rigidly attached to the loading machine, vertical movement of the ground contact wheel as it travels over the contours of the ground causes the transverse coupling 33 to hinge about its hook connection to the truck chassis so that the outer end moves up and down between points x and z as shown in FIGURE 8. The conveyor frame moves in complete unison with the transverse coupling 33 pivoting along the axis MN as shown in FIGURES 6 and 7. The longitudinal stabilizer tractive coupling 34 being pivotally connected to transverse bar stabilizer 33 and the frame of the vehicle affords rigid stability to the loader in relation to the towing vehicle and at the same time, it transmits the tractive force from the towing vehicle to the loader. The support standard 35 besides holding the rear portion of the loader in an elevated position offers a pivot point at the U-bolt 49. This arrangement allows the loader to float along-side the transporting vehicle, move in complete unison with it, but still deflect in relation to it due to irregularities in the ground.

A lift mechanism comprising a conventional hoisting drum 51 and rachet lever 52 is attached to the towing vehicle. A chain 53, one end of which is attached to a lower portion of the inner conveyor frame, is attached to the hoisting drum 51 such that by operating the lever 52 the hoisting drum 51 is rotated causing the chain 53 to be wound around it and to lift the loader off the ground. Held in this position the loader may be transported from place to place at high speed and without the necessity of operating the loader. When operation of the loader is to be resumed it is merely necessary to release the hoisting drum 51 allowing the loader to drop to be supported by the ground wheel. The length of the lift chain 53 is limited so that the loader may drop only a relatively short distance below the normal ground level and thus avoid damage thereto caused by a deep hole or ditch in the ground.

Disengagement of the loader from the towing vehicle is a simple operation. An A-frame 54 is pivotally attached to the underside of the conveyor frame on the support arm 45¹ for the V-shaped support rod 48, and is held in inoperative position by chain 54¹ which is hooked to both sides of the conveyor frame. When the chain is released the A-frame assumes a substantially vertical position after which pins 46 and 59 are removed from the support standard 35. The rear portion of the loader then rests on the A-frame 54 and the support standard may be slid out of bracket 44. Retaining keys 42 are removed from hooks 36 and 37 after which the couplings 33 and 34 may be lifted out of brackets 38 and 39. The loader is then held in an inclined position and is capable of readily being remounted on the towing vehicle when necessary.

For operation the bale loader is coupled, in the manner described above, to the truck or other vehicle, as shown in FIGURE 1. The truck and loader is advanced in the general direction of the bales 55 lying on the ground and a bale upon coming in contact with skid-guides 25 is longitudinally aligned with the conveyor. The leading bottom edge of the bale upon coming in contact with vanes 22 is lifted sufficiently that lugs 56 mounted on the conveyor chain penetrate and hold the bottom side of the bale and carry it upwardly along the skid plates 15. The bales are maintained in alignment on the skid plates by the upper bars 11 on both sides of the conveyor and by rail 60 which is rigidly held in place a spaced distance above the conveyor chain by U-shaped support rods 57 and 58. The distance between the conveyor chain and the rail 60 may be adjusted in any suitable manner. Such adjustment is necessary depending on the dimensions of the bales as determined by the particular baling machine. Upon reaching the top of the conveyor chain the bale receiving platform where an attendant, standing on the truck bed may slide the bales off the platform and onto the truck bed or on top of previously loaded bales.

With the device as just described one is able to load bales onto a moving vehicle with relative ease and economy. The loader is simply constructed yet offers the features of considerably more expensive models. The three-point suspension system eliminates the need for an independent carrier system for the loading machine yet at the same time it offers "floating action" between the loader and the truck normally only found in loaders equipped with an independent carrier system. The incline of the loader may be easily adjusted to compensate for variations in truck bed heights or higher loading as the truck becomes fully loaded. The conveyor drive system has been simplified by use of the crossed V-belt, elimination of the more costly intermediate gearing, clutches, etc. Load on the traction wheel is always sufficient to insure drive of the conveyor chain.

It is understood that variations in detail of construction are possible without departing from the spirit and scope of this invention as claimed.

I claim:

1. Means for coupling a towed vehicle to the side of a towing vehicle including in combination a towed vehicle having laterally spaced side frames inclined upwardly from front to rear, a single wheel, only, attached to the front of said towed vehicle and in contact with the ground to support the towed vehicle front end, a substantially transverse bar member rigidly attached to the frame of said towed vehicle, means to pivotally attach said transverse member to said towing vehicle, a generally longitudinal member pivotally attached to said bar member and to said towing vehicle, a support standard adapted to be substantially vertically attached to said towing vehicle and means for pivotally attaching the rear portion of said towed vehicle to, above, and laterally of said support standard to maintain the frame of said towed vehicle in said inclined position.

2. The coupling means according to claim 1 wherein said support standard is vertically adjustable to change the incline of said towed vehicle.

3. The coupling means of claim 2 in which said standard extends through sockets attached respectively to both vehicles whereby it may be released to drop out of both sockets, and a support carried by the towed vehicle adapted to be positioned on the ground to hold the rear portion of the towed vehicle elevated when said standard is dropped.

4. The coupling means according to claim 1 wherein said transverse bar member is universally attached to the towing vehicle side and rigidly attached to both of the spaced side frames of said towed vehicle.

5. The coupling means of claim 4 in which the said rigid attachments are individually adjustable to compensate for varying heights of towing vehicles.

6. The coupling means according to claim 1 wherein said single wheel adapted for contact with the ground is attached to said towed vehicle in a position extending beyond both side frames thereof from said towing vehicle, and the portion of the towed vehicle close to the towing vehicle is supported by said transverse bar and its attachment to the towing vehicle.

7. A towed vehicle adapted to be supported beside and propelled by a towing vehicle; said towed vehicle having laterally spaced, connected side frames inclined upwardly from front to rear, a single wheel rotatively attached to said towed vehicle at the front remote side thereof from the towing vehicle and normally in contact with the ground, a substantially transversely disposed bar member rigidly attached to both said frame members on the towed vehicle and adapted to be universally attached to the adjacent side of said towing vehicle, a generally longitudinal member having one end pivotally attached to said bar member and adapted to have its opposite end pivoted to said towing vehicle, a support standard adapted to be substantially vertically attached to said towing vehicle, and means for universally attaching the rear portion of said towed vehicle, intermediate said longitudinally disposed frame members thereof, to said support standard to maintain said towed vehicle in said inclined position.

8. The towed vehicle of claim 7 in which the wheel provides power to drive elevating mechanism on said towed vehicle, said generally longitudinal member being inclined upwardly and rearwardly from said towed to the towing vehicle whereby it pushes the towed vehicle and exerts a downward pressure to increase the tractive effort of said wheel.

9. The towed vehicle arrangement of claim 7 in which means is provided to lift said wheel from the ground for rapid transportation of the towed and towing vehicles without elevator drive.

10. The towed vehicle arrangement of claim 7 in which said elevator comprises a lugged chain extending longitudinally of and between said frames, upper and lower shafts extending transversely of said frames and each mounting a sprocket carrying said chain, a pulley on said traction wheel and one on said upper shaft and a crossed belt connecting said pulleys to drive the upper reach of said chain upwardly between said frames as the vehicle moves forwardly.

References Cited in the file of this patent

UNITED STATES PATENTS 2,400,086    Hansen _____ May 14, 1946

FOREIGN PATENTS 203,313    Australia _____ Sept. 13, 1956